United States Patent
Nguyen et al.

(10) Patent No.: US 12,141,587 B2
(45) Date of Patent: Nov. 12, 2024

(54) GENERALIZED BOOT OPERATION FOR DISAGGREGATED, MULTIPLE (MULTI-) DIE COMPUTING SYSTEMS, AND RELATED METHODS

(71) Applicant: Ampere Computing LLC, Santa Clara, CA (US)

(72) Inventors: Kha Hong Nguyen, San Jose, CA (US); Harb Ali Abdulhamid, Raleigh, NC (US)

(73) Assignee: Ampere Computing LLC, Santa Clara, CA (US)

( * ) Notice: Subject to any disclaimer, the term of this patent is extended or adjusted under 35 U.S.C. 154(b) by 237 days.

(21) Appl. No.: 17/808,946

(22) Filed: Jun. 24, 2022

(65) Prior Publication Data
US 2023/0418620 A1 Dec. 28, 2023

(51) Int. Cl.
*G06F 9/4401* (2018.01)

(52) U.S. Cl.
CPC .................... *G06F 9/4405* (2013.01)

(58) Field of Classification Search
CPC .. G06F 9/4405; G06F 9/4406; G06F 9/44505; G06F 11/1417
USPC .......................................................... 713/2
See application file for complete search history.

(56) References Cited

U.S. PATENT DOCUMENTS

| | | | | |
|---|---|---|---|---|
| 10,795,853 B2* | 10/2020 | Nassif | .................... | G06F 15/167 |
| 11,029,973 B1* | 6/2021 | Teng | .................... | G06F 11/1417 |
| 11,216,284 B2* | 1/2022 | Liu | ....................... | G06F 9/4405 |
| 2016/0004542 A1* | 1/2016 | Das | ....................... | G06F 9/4405 |
| | | | | 713/2 |
| 2021/0109762 A1* | 4/2021 | Feng | ..................... | G06F 13/362 |
| 2022/0244966 A1* | 8/2022 | Nguyen | ............... | G06F 9/4405 |
| 2023/0078138 A1* | 3/2023 | Kumar | ................. | G06F 21/575 |
| | | | | 726/22 |

* cited by examiner

*Primary Examiner* — Brian T Misiura
(74) *Attorney, Agent, or Firm* — Withrow & Terranova, PLLC

(57) ABSTRACT

Generalized boot operations for disaggregated, multiple (multi-) semiconductor die ("die") computing system, and related methods and computer-readable media are disclosed. In exemplary aspects, to provide for generalized boot-up firmware/software for the computing system that does not have to be reconfigured for different configurations of dies in variations of IC packages, a CPU die (or other die) designated as a primary die is configured to perform a discoverable boot process over a side-band discovery bus to discover the other dies present in an IC package of the computing system and to then control their boot-up operations. In this manner, the boot-up firmware/software executed by the primary die to boot-up the computing system can be generalized irrespective of the number of dies and their particular configuration. In this manner, a generalized boot-up firmware/software can be provided to control boot-up operations of the computing system independent of specific dies included.

23 Claims, 9 Drawing Sheets

| PAGE REGION 304 | ADDRESS 306 | ADDRESS 308 |
|---|---|---|
| DISCOVERY PAGE (202) | 0x0000-0x3FFF | 0x0000-0x3FFF |
| COMMON LOGIC PAGE (302) | 0x4000-0x7FFF | DISCOVERED |
| LINK CONFIG. PAGE (204) | 0x8000-DIE DEPENDENT RANGE | DISCOVERED |

FIG. 3A

- FOR EACH SUB. DIE (108(1)-108(N)): 0...MAX_DIE_COUNT
  - IF DIE PRESENT (DIE TYPE != 0) (504)
    - PARSE DISCOVERY PAGE (508) (202) (506)
    - IF eFUSE SUPPORTED (508)
      - LOAD eFUSE INTO REGISTERS (510)
      - IF EFUSE DATA (208S) VALID (512)
        - PROCESS RDI CONNECTIVITY ARRAY (210) (514)
    - ELSE (E.G. NO eFUSE IN MASTER DIE (104) (516)
    - PROCESS COMM. LINK INFO. ARRAY (208) (518)
    - PROCESS (COMMON LOGIC PAGE (302) TO INITIALIZE COMMON LOGIC) (519)
    - DETERMINE NUMBER OF SUB-LINKS PER RDI LINK (114-114(N)) (520)
    - PARSE PER RDI INFO ARRAY (208) (522)
    - FOR RDI LINK ID: 0...L
      - DETERMINE NUMBER OF RDI SUB-LINKS IN RDI LINK (526)
      - FOR RDI SUB-LINK ID: 0...M
        - LOCATE RDI LINK ON SLAVE DIE (108(1)-108(N)) (528)
        - INITIALIZE BOTH SIDES OF THE COMM. SUBLINK (530)
        - UPDATE STATUS OF LINK IN GLOBAL CONNECTIVITY STRUCTURE (602) (532)
          - IF SUCCESS: INDICATE BOTH TX/RX COMM. SUBLINK HAVE BEEN INITIALIZED (534)
          - ELSE: INDICATE TX/RX COMM. SUBLINK HAVE FAILED TO INITIALIZE (536)
- ELSE: NEXT DIE

| PAGE REGION 304 | ADDRESS 306 | ADDRESS 308 |
|---|---|---|
| DISCOVERY PAGE (202) | 0x0000-0x3FFF | 0X0000-0X3FFF |
| COMMON LOGIC (300) | 0x4000-0x7FFF | DISCOVERED |
| RDI LINK ARRAY[L] (204) | 0x8000-DIE DEPENDENT RANGE | DISCOVERED |
| LOCAL SYSTEM MEMORY ACCESS PAGE (700) | 0x8000-DIE DEPENDENT RANGE | DISCOVERED |
| LOCAL CONFIG DEBUG PAGE (702) | 0xA000-DIE DEPENDENT RANGE | DISCOVERED |

FIG. 7

GENERALIZED BOOT OPERATION FOR DISAGGREGATED, MULTIPLE (MULTI-) DIE COMPUTING SYSTEMS, AND RELATED METHODS

FIELD OF THE DISCLOSURE

The technology of the disclosure relates to computing systems employing one or more central processing units (CPUs), and more particularly boot-up operations in the CPUs.

BACKGROUND

Computing systems include one or more central processing units (CPUs). The CPUs are provided as integrated circuit (IC) chips (also called "CPU chips") that are mounted on a circuit board. The computing system can also include other computing resources mounted on the same or a coupled circuit board, such as boot storage, memory, and interfacing circuits. For example, if the computing system is employed as a computer server, the computing system can be provided on a circuit board as server blade.

As computing systems go to new process nodes for scalability, designers are moving to multiple (multi-) semiconductor die ("die") architectures provided in a multi-die package. Multi-die packages include multiple dies ("dies") (e.g., chiplets), which may include unique or repeated dies and are communicatively linked together through high-speed links within the package. From an operating system and software perspective, the hardware resources provided in these multiple, distributed dies appear as one resource of computing hardware, but at a hardware level, the computing hardware is distributed about the different dies. For example, in a computing system chip package, one die could be a central compute die having one or more CPU cores that perform computing operations, and other dies could be input/output (I/O) dies that are communicatively coupled to the central compute die. The central compute die has ports that support communication to the I/O dies. This architecture allows packages to be provided in different configurations of dies and connectivity to the compute die more easily for enhanced design modularity and flexibility.

As with any computing system, a multi-die computing system undergoes a start-up process known as a "boot" or "boot-up" process when a power cycle occurs or a reset is performed. During a boot process, various hardware components and software processes in the computing system are initialized and other boot-up operations performed to prepare these components and processes to be able to perform tasks according to operating system and application software executed by a CPU. In the example of a multi-die computing system, the boot process needs to be controlled and managed for each of the dies as the computing system is not provided as a single hardware resource and die. As an example, a central or primary die can be configured to have a primary processor that includes boot firmware that is initiated on a reset to control the boot-up operations of the auxiliary dies. However, the number, type, and arrangement of dies provided in a given multi-die computing system can vary from package to package, thus requiring the boot-up operations to vary for each unique design of the multi-die computing system. This may create challenges in design and implementation management of multi-die computing systems as a result of having to manage and provide unique boot-up operations for different arrangements in multi-die computing systems, including any specialized boot-up circuitry and firmware/software.

SUMMARY

Aspects disclosed herein include generalized boot operations for disaggregated, multiple (multi-) semiconductor die ("die") computing system. Related methods and computer-readable media are also disclosed. The computing system includes central processing unit (CPU) that is realized on a die (e.g., a chiplet) that is included in an integrated circuit (IC) package. The computing system also includes one or more other dies (e.g., as subsidiary dies, such as input/output (I/O) chiplets) that are integrated in the IC package as a system-on-a-chip (SoC) to provide supporting circuitry for the CPU die. In this manner, the CPU die and other supporting dies are disaggregated in the IC package to provide for flexibility in design and configuration of the IC package. The IC package can be fabricated by integrating only the particular dies that are needed for its application, without the need to create specific dies for specific IC packages. In exemplary aspects, to provide for generalized boot-up firmware/software for the computing system that does not have to be reconfigured for different configurations of dies in variations of IC packages, the CPU die (or other die) designated as a primary die is configured to perform a discoverable boot process to discover the other dies present in the IC package of the computing system and to then control their boot-up operations. In this manner, the boot-up firmware/software executed by the primary die to boot-up the computing system can be generalized irrespective of the number of dies included and their particular configuration. In this regard, in examples disclosed, the IC package includes a side-band, discovery bus that interconnects the primary die (e.g., the CPU die) and the other dies. The discovery bus is a separate bus from communication links that connect the other dies to the CPU die. In a boot-up operation, the primary die discovers the other dies through communications on the discovery bus. The other dies and the primary die exchange information on the discovery bus sufficient for the primary die to discover communication links and/or other configuration information for each of the other dies. These communication links between the primary die and the other dies may be high-speed communication links that require specific initializations and configurations that are not known during early stages in the boot-up operation. The primary die uses this discovery configuration information to coordinate the overall boot flow and boot-up tasks in the other dies, which includes initializing the communication links between primary die and the other specific dies. After the boot-up operations are performed, the primary die can then communicate with the other dies over the configured communication links to call upon the resources of the other dies to perform the application operations of the computing system.

In this manner, the disaggregated, multi-die computing system is flexible to allow different configurations of dies without having to provide specific, unique boot-up firmware/software to perform boot-up operations. The specific low-level boot-up operations can be extracted and removed from higher level boot-up software/firmware, so that the boot-up firmware/software is not specific to each unique combination of dies in an IC package of the computing system. The low-level boot-up firmware/software does not have to be designed based on specific, hardwired interfaces between the CPU die and the other dies in the IC package of the computing system. Higher level boot-up firmware or software that is executed in the CPU die can execute transparently to the circuitry of the computing system being split and disaggregated among the multiple dies in the IC package of the computing system. Also, the discovery bus can be used outside of boot-up operations as a secondary communications path between the primary die and the other dies in the computing system, if desired, such as in the instance of a main communication link between the primary die and another die having a fault.

In this regard, in one exemplary aspect, a computing system is provided. The computing system comprises a primary die comprising a central processing unit (CPU), and a plurality of subsidiary dies each coupled to one or more communication links coupled to the primary die. The computing system also comprises a discovery bus coupled to the primary die and the plurality of subsidiary dies. The primary die further comprises a boot processor. The boot processor is configured to, in response to a boot-up response for the computing system, for each subsidiary die indicator of a plurality of subsidiary die indicators: request a discovery page for the subsidiary die of the plurality of subsidiary dies identified by the subsidiary die indicator over the discovery bus, and receive the discovery page of the identified subsidiary die is received over the discovery bus. In response to the discovery page of the identified subsidiary die being received over the discovery bus, the boot processor is further configured to request a link configuration page for the one or more communication links coupled to the identified subsidiary die over the discovery bus, receive the link configuration page for the identified subsidiary die over the discovery bus, and initialize the one or more communication links coupled to the identified subsidiary die based on the received link configuration page. The CPU is configured to communicate requests with each of the plurality of subsidiary dies over at least one communication link of their respective coupled one or more communication links.

In another exemplary aspect, a method of performing a boot-up operation for discovered subsidiary dies in a computing system is provided. The method comprises receiving a boot-up signal in the computing system. In response to the received boot-up signal, for each subsidiary die indicator of a plurality of subsidiary die indicators, the method also comprises a boot-up processor in a primary die requesting a discovery page for a subsidiary die of a plurality of subsidiary dies identified by a subsidiary die indicator over a discovery bus coupled to the primary die and the plurality of subsidiary dies, and determining the discovery page of the identified subsidiary die received over the discovery bus. In response to the discovery page of the identified subsidiary die being received over the discovery bus, the method also comprises requesting a link configuration page for one or more communication link coupled to the identified subsidiary die over the discovery bus, receiving the link configuration page for the identified subsidiary die over the discovery bus, and initializing the one or more communication links coupled to the identified subsidiary die based on the received link configuration page. The method also comprises communicating requests with each of the plurality of subsidiary dies over at least one communication link of their respective coupled one or more communication links.

In another exemplary aspect, a non-transitory computer-readable medium is provided. The non-transitory computer-readable medium has stored thereon computer executable instructions which, when executed by a processor in a primary die in a computing system, cause the processor to perform a boot-up operation for discovered subsidiary dies in the computing system, by causing the processor to receive a boot-up signal, in response to the received boot-up signal, for each subsidiary die indicator of a plurality of subsidiary die indicators: request a discovery page for a subsidiary die of a plurality of subsidiary dies coupled to one or more communication links identified by a subsidiary die indicator over a discovery bus communicatively coupled to the primary die and the plurality of subsidiary dies, receive the discovery page of the identified subsidiary die received over the discovery bus; and in response to the discovery page of the identified subsidiary die being received over the discovery bus: request a link configuration page for the one or more communication links coupled to the identified subsidiary die over the discovery bus, receive the link configuration page for the identified subsidiary die over the discovery bus, and initialize the one or more communication links coupled to the identified subsidiary die based on the received link configuration page; and communicate requests with each of the plurality of subsidiary dies over at least one communication link of their respective coupled one or more communication links.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 1 is a block diagram of an exemplary multiple (multi-) semiconductor die (die) computing system that includes a primary die connected through a side-band discovery bus to a plurality of other, subsidiary dies, and wherein the primary die is also connected to the subsidiary dies through configurable, dedicated communication links that are initialized and activated as part of a die discovery process performed by the primary die;

FIG. 2 is a block diagram illustrating an exemplary discovery bus address page stored in the subsidiary dies with discovery information for a given subsidiary die that is addressable by the primary die over the discovery bus to discover presence and configuration information for the subsidiary dies;

FIG. 3A is a table illustrating an exemplary subsidiary die configuration page address map for the primary die to access discovery information stored in respective discovery bus address pages in the subsidiary dies over the discovery bus for initiating boot-up operations in the subsidiary dies and initializing and activating the dedicated communication links between the primary die and the subsidiary dies;

FIG. 5 is a flow diagram illustrating an exemplary subsidiary die discovery pseudocode process performed by the primary die as part of a boot-up operation of its computing system, to discover and initiate boot-up operations in the discovered subsidiary dies and initialize and activate dedicated communication links to the discovered subsidiary dies;

Figure 8:
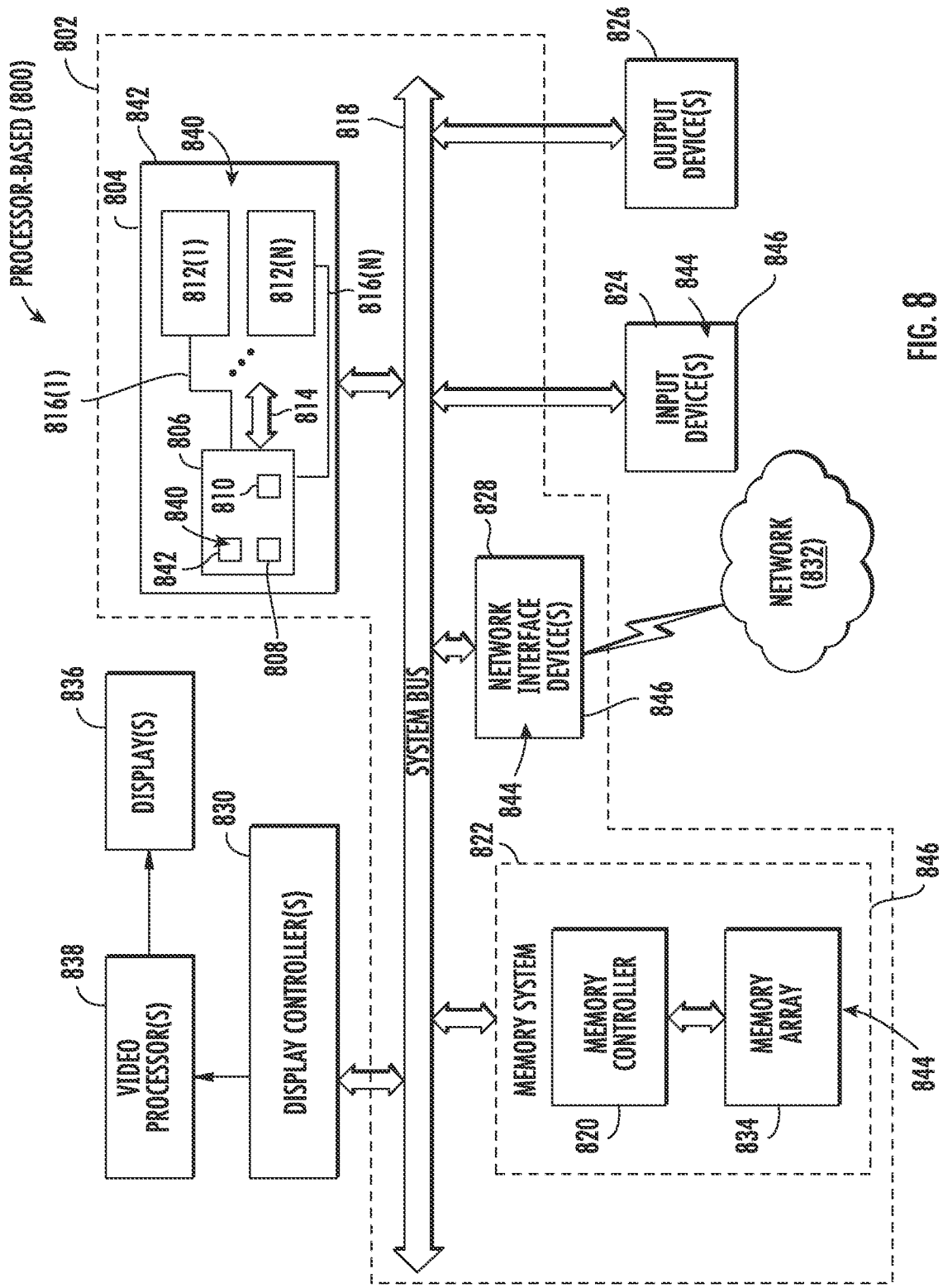

FIG. 7 is a table illustrating exemplary additional address mapping that can be provided in the discovery bus address map in FIG. 3A to allow the primary die to directly access local system memory and the configuration/debug address space of the subsidiary dies over the discovery bus; and FIG. 8 is a block diagram of an exemplary processor-based system that includes a multi-die computing system that includes a primary die connected through a side-band discovery bus to a plurality of other, subsidiary dies, and wherein the primary die is configured to perform a subsidiary die discovery process to discover and initiate boot-up operations in the discovered subsidiary dies, and initialize and activate dedicated communication links to the discovered subsidiary dies.

DETAILED DESCRIPTION

Aspects disclosed herein include generalized boot operations for disaggregated, multiple (multi-) semiconductor die ("die") computing system. Related methods and computer-readable media are also disclosed. The computing system includes central processing unit (CPU) that is realized on a die (e.g., a chiplet) that is included in an integrated circuit (IC) package. The computing system also includes one or more other dies (e.g., as subsidiary dies, such as input/output (I/O) chiplets) that are integrated in the IC package as a system-on-a-chip (SoC) to provide supporting circuitry for the CPU die. In this manner, the CPU die and other supporting dies are disaggregated in the IC package to provide for flexibility in design and configuration of the IC package. The IC package can be fabricated by integrating only the particular dies that are needed for its application, without the need to create specific dies for specific IC packages. In exemplary aspects, to provide for generalized boot-up firmware/software for the computing system that does not have to be reconfigured for different configurations of dies in variations of IC packages, the CPU die (or other die) designated as a primary die is configured to perform a discoverable boot process to discover the other dies present in the IC package of the computing system and to then control their boot-up operations. In this manner, the boot-up firmware/software executed by the primary die to boot-up the computing system can be generalized irrespective of the number of dies included and their particular configuration. In this regard, in examples disclosed, the IC package includes a side-band, discovery bus that interconnects the primary die (e.g., the CPU die) and the other dies. The discovery bus is a separate bus from communication links that connect the other dies to the CPU die. In a boot-up operation, the primary die discovers the other dies through communications on the discovery bus. The other dies and the primary die exchange information on the discovery bus sufficient for the primary die to discover communication link and/or other configuration information for each of the other dies. These communication links between the primary die and the other dies may be high-speed communication links that require specific initializations and configurations that are not known during early stages in the boot-up operation. The primary die uses this discovery configuration information to coordinate the overall boot flow and boot-up tasks in the other dies, which includes initializing the communication links between primary die and the other specific dies. After the boot-up operations are performed, the primary die can then communicate with the other dies over the configured communication links to call upon the resources of the other dies to perform the application operations of the computing system.

In this manner, the disaggregated, multi-die computing system is flexible to allow different configurations of dies without having to provide specific, unique boot-up firmware/software to perform boot-up operations. The specific low-level boot-up operations can be extracted and removed from higher level boot-up software/firmware, so that the boot-up firmware/software is not specific to each unique combination of dies in an IC package of the computing system. The boot-up firmware/software does not have to be designed based on specific, hardwired interfaces between the CPU die and the other dies in the IC package of the computing system. Higher level boot-up firmware or software that is executed in the CPU die can execute transparently to the circuitry of the computing system being split and disaggregated among the multiple dies in the IC package of the computing system. Also, the discovery bus can be used outside of boot-up operations as a secondary communications path between the primary die and the other dies in the computing system, if desired, such as in the instance of a main communication link between the primary die and another die having a fault.

Figure 1:
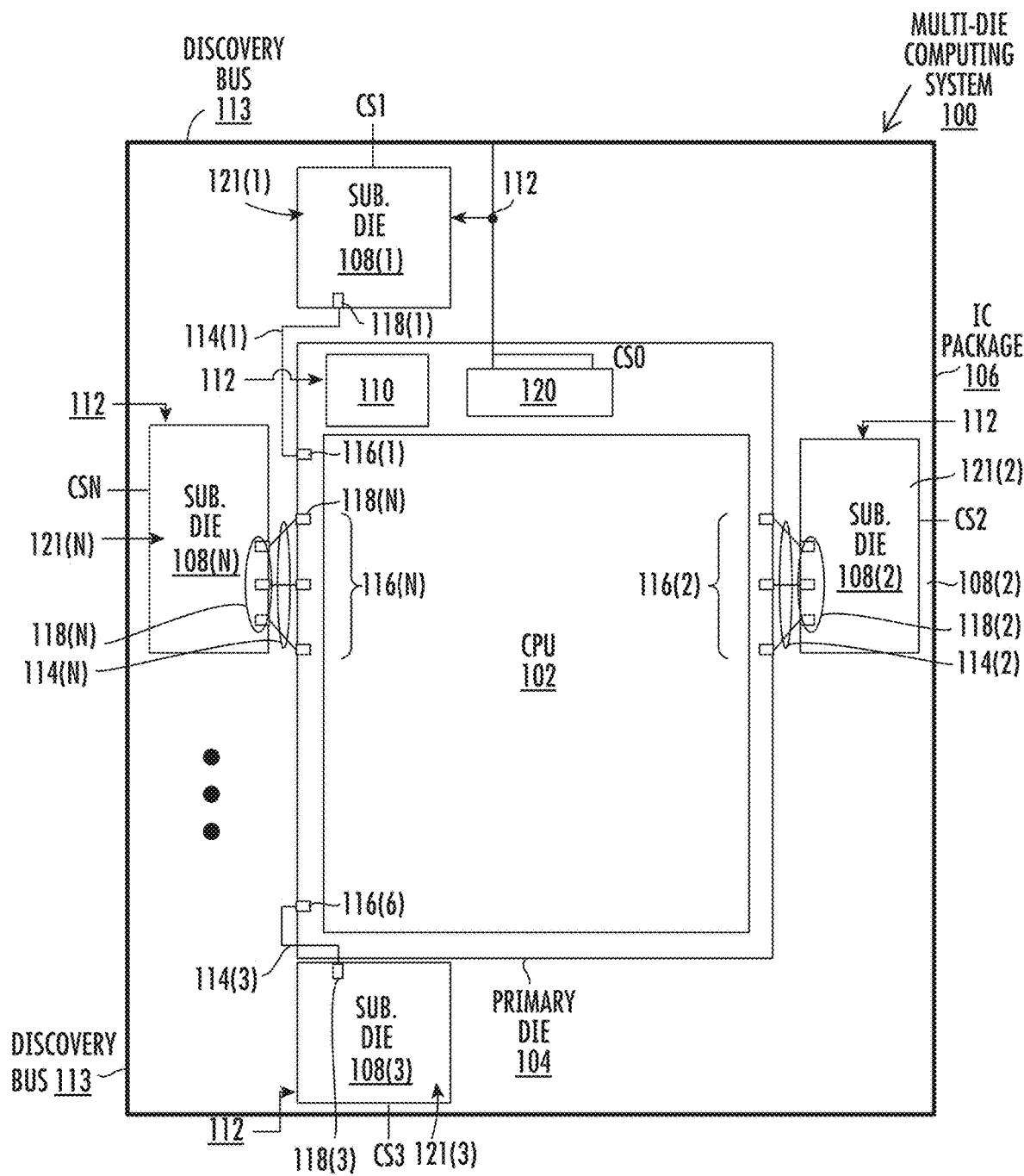

In this regard, FIG. 1 is a block diagram of an exemplary multiple (multi) semiconductor die (die) computing system 100 that is configured to perform a boot-up operation using generalized boot-up firmware/software. The multi-die computing system 100 is also referred to herein as "computing system 100." The computing system 100 includes central processing unit (CPU) 102 that is realized on a semiconductor die 104 (e.g., a chiplet), which is a primary die 104, that is included in an integrated circuit (IC) package 106. For example, the primary die 104 may be a primary die 104 that includes a controlling or primary CPU 102. The computing system 100 also includes other subsidiary dies 108(1)-108(N) (such as input/output (I/O) chiplets) that are integrated in the IC package 106 as a system-on-a-chip (SoC) in this example to provide supporting circuitry for the CPU 102 in the primary die 104, where 'N' can be any positive integer. Non-limiting examples of circuitry for supporting specific I/O tasks and protocols that can be included or dedicated to subsidiary dies 108(1)-108(N) include a peripheral component interconnect express (PCIe), a microcontroller (MCU), a cache coherent interconnect for accelerators (CCIX), and compute express link (CXL). For example, the subsidiary dies 108(1)-108(N) may be subsidiary dies that are called upon by the CPU 102 in the primary die 104 to take certain actions or perform certain tasks. In this manner, the CPU 102 in the primary die 104 and the other supporting, subsidiary dies 108(1)-108(N) are disaggregated in the IC package 106 to provide for flexibility in design and configuration of the computing system 100. The IC package 106 can be fabricated by integrating only the particular subsidiary dies 108(1)-108(N) desired that are needed for its application, without the need to create specific dies for specific IC packages.

With continuing reference to FIG. 1, the primary die 104 and/or its CPU 102 may also include a boot processor 110 that is configured to receive a reset signal 112 and to perform a boot-up operation of the computing system 100 in response to the reset signal 112. For example, the reset signal 112 may be a power-on reset (POR) signal that is generated when the computing system 100 is reset or is powered-on. The boot-up operation is performed to prepare these circuits in the computing system 100, including in the primary die 104 and the subsidiary dies 108(1)-108(N) to be able to perform tasks as controlled by an operating system, hypervisor, and/or application software executed by the CPU 102. As an example, the boot processor 110 may be configured to execute a low-level binary bootloader that is executed on boot-up to perform certain lower-level boot-up tasks and also to load in higher-level boot program code to be executed to perform higher-level boot-up operations. These boot-up tasks prepare the hardware and software components in the computing system 100 to be utilized.

Because the computing system 100 in FIG. 1 is designed so that the number and type of subsidiary dies 108(1)-108(N) included in the IC package 106 is flexible, it is desired to provide for a generalized boot-up firmware/software to be executed by the boot processor 110 of the computing system 100 that minimizes or eliminates reconfiguration (i.e., have different image variations) for different configurations of subsidiary dies 108(1)-108(N) in the computing system 100. The CPU 102 and boot processor 110 will not know the type and number of subsidiary dies 108(1)-108(N) coupled to the primary die 104 and included in the computing system 100 on boot-up. In this regard, as discussed in more detail below, the CPU 102 and/or its boot processor 110 in the primary die 104 is configured to perform a discoverable boot process to discover the other subsidiary dies 108(1)-108(N) present in the IC package 106 of the computing system 100 and to then control their boot-up operations. In this manner, the boot-up firmware/software executed by the CPU 102 and/or the boot processor 110 in the primary die 104 to boot-up the computing system 100 can be generalized irrespective of the number of subsidiary dies 108(1)-108(N) included and their particular configuration. In examples discussed below, the IC package 106 includes a side-band, discovery bus 113 that interconnects the primary die 104, its CPU 102, and the other subsidiary dies 108(1)-108(N). The discovery bus 113 is a separate bus from communication links 114(1)-114(N) that connect the other subsidiary dies 108(1)-108(N) to the primary die 104.

As discussed in more detail below, in a boot-up operation, the CPU 102 and/or its boot processor 110 in the primary die 104 discovers the other subsidiary dies 108(1)-108(N) through communications on the discovery bus 113. The discovery bus 113 may be configured as a common bus in which chip selects CS1-CSN are activated on the discovery bus 113 to communicate to a particular subsidiary die 108(1)-108(N). In this example, although not shown directly in FIG. 1, the discovery bus 113 includes unique signal lines for each chip select CS1-CSN. The primary die 104 includes N chip select outputs that are each coupled to a respective chip select input on a subsidiary die 108(1)-108(N). The N chip select outputs from the primary die 104 can be coupled to a respective chip select input on a subsidiary die 108(1)-108(N) during package integration of the multi-die computing system 100. In this manner, as discussed in more detail below, common addresses can be used by the CPU 102 and/or the boot processor 110 to discover the presence of subsidiary dies 108(1)-108(N) and configuration information of the subsidiary dies 108(1)-108(N) in a generalized manner, without having to understand the type and number of subsidiary dies 108(1)-108(N) present. The subsidiary dies 108(1)-108(N) and the primary die 104 exchange information (e.g., configuration information, communication information) on the discovery bus 113 sufficient for the CPU 102 and/or the boot processor 110 to detect the presence of subsidiary dies 108(1)-108(N) and communication link and/or other configuration information for each of the subsidiary dies 108(1)-108(N).

For example, the communication links 114(1)-114(N) between the primary die 104 and the subsidiary dies 108(1)-108(N) may be high-speed communication links that require specific initializations and configurations that are not known during early stages in the boot-up operation. The CPU 102 and/or the boot processor 110 uses this discovery configuration information to coordinate the overall boot flow and boot-up tasks in the subsidiary dies 108(1)-108(N), including initializing the communication links 114(1)-114(N) between primary die 104 and the other subsidiary dies 108(1)-108(N). After the boot-up operations are performed, the CPU 102 can communicate with the subsidiary dies 108(1)-108(N) over the configured communication links 114(1)-114(N) independently to call upon the resources of the other subsidiary dies 108(1)-108(N) to perform the application operations of the computing system 100.

In this manner, the computing system 100 in FIG. 1 is flexible to allow different configurations of subsidiary dies 108(1)-108(N) without having to support specific, boot-up firmware/software that is unique to particular subsidiary die 108(1)-108(N) packaging and configurations to perform boot-up operations for the computing system 100, yet maintain the advantage of a disaggregated computing system 100 with the disaggregation of the primary die 104 from subsidiary dies 108(1)-108(N). The specific low-level boot-up operations can be extracted and removed from higher-level boot-up software/firmware, so that the boot-up firmware/software is not specific to each unique combination of subsidiary dies 108(1)-108(N) in an IC package 106 of the computing system 100. The boot-up firmware/software does not have to be designed based on specific, hardwired interfaces between the primary die 104 and the subsidiary dies 108(1)-108(N) in the IC package 106 of the computing system 100. Higher level boot-up firmware or software that is executed in the primary die 104 can execute transparently to the circuitry of the computing system 100 being split and disaggregated among the primary die 104 and multiple subsidiary dies 108(1)-108(N) in the IC package 106 of the computing system 100. Also, the discovery bus 113 can be used outside of boot-up operations as a secondary communications path between the primary die 104 and the subsidiary dies 108(1)-108(N) in the computing system 100, if desired, such as in the instance of a main communication link 114(1)-114(N) between the primary die 104 and a subsidiary die 108(1)-108(N) having a fault.

With continuing reference to FIG. 1, the primary die 104 is also communicatively coupled to the subsidiary dies 108(1)-108(N) through respective communication links 114(1)-114(N). The communication links 114(1)-114(N) coupling each subsidiary die 108(1)-108(N) to the primary die 104 can include one or more communication links that each include dedicated primary communications ports 116(1)-116(N) as part of the primary die 104 and dedicated subsidiary communications ports 118(1)-118(N) as part of respective subsidiary dies 108(1)-108(N). A communication link 114(1)-114(N) is referred to singularly herein, but note that each communication link 114(1)-114(N) can include more than one actual communication link (e.g., a conductor). The respective primary communications ports 116(1)-116(N) in the primary die 104 are coupled to the subsidiary communications ports 118(1)-118(N) of the respective subsidiary dies 108(1)-108(N) as part of the communication links 114(1)-114(N) coupling the primary die 104 to the respective subsidiary dies 108(1)-108(N). The primary die 104 includes a primary discovery bus interface circuit 120 that couples the primary die 104 to the discovery bus 113. Each subsidiary die 108(1)-108(N) also includes a subsidiary discovery bus interface circuit 121(1)-121(N) that couples the respective subsidiary die 108(1)-108(N) to the discovery bus 113. The discovery bus 113 may be an advanced interface bus (AIB) for example. The communication links 114(1)-114(N) may be remote debug interface (RDI) links or other types of links that provide high-speed interfaces between the primary die 104 and the respective subsidiary dies 108(1)-108(N). Examples of information that can be communicated over the discovery bus 113 between the primary die 104 and a subsidiary die 108(1)-108(N) include register configuration information, data, interrupts, and interrupt messages. The communication links 114(1)-114(N) in the example computing system 100 in FIG. 1 are each dedicated between the primary die 104 and a particular subsidiary die 108(1)-108(N) so that the CPU 102 can send and receive requests to each of the subsidiary dies 108(1)-108(N) independently and without consuming bandwidth on other communication links 114(1)-114(N) to other subsidiary dies 108(1)-108(N). The boot processor 110 can also use the communication link 114(1)-114(N) once initialized and activated to perform and initiate higher-level boot-up tasks for the subsidiary dies 108(1)-108(N).

As discussed above, the CPU 102 and/or the boot processor 110 is configured to communicate requests over the discovery bus 113 to discover the subsidiary dies 108(1)-108(N) present in the computing system 100 and to also receive configuration information. For example, this discovery process can involve the CPU 102 and/or the boot processor 110 querying for subsidiary dies 108(1)-108(N) that are present according to a subsidiary die indicator on the discovery bus 113. For example, the subsidiary die indicator in this example can be the chip select CS1-CSN wherein the CPU 102 and/or the boot processor 110 sets the chip select CS1-CSN to indicate the subsidiary die indicator for the respective subsidiary die 108(1)-108(N) to be discovered. This discovered information from a subsidiary die 108(1)-108(N) includes configuration information includes communications configuration information that allows the CPU 102 and/or the boot processor 110 to configure the communication links 114(1)-114(N). For example, the primary die 104 may include a mesh network of communications circuits that can be configured based on the communications configuration information received from discovered subsidiary dies 108(1)-108(N) to setup the particular communications ports 118(1)-118(N) in primary die 104 that are coupled to and used to communicate to the subsidiary dies 108(1)-108(N).

Figure 2:
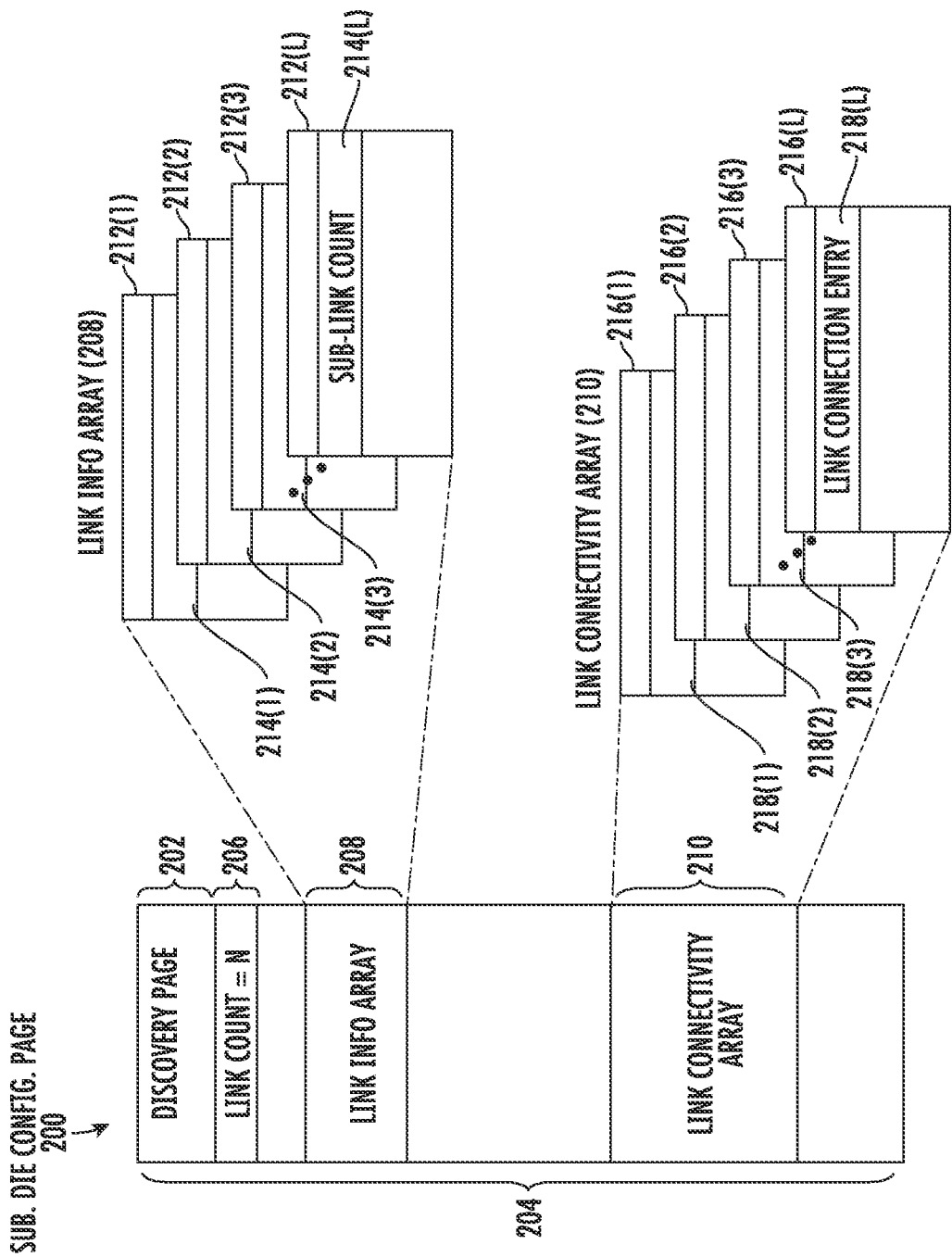

In this regard, FIG. 2 is a block diagram illustrating an exemplary subsidiary die configuration page 200 stored in each subsidiary die 108(1)-108(N) with discovery information for its device, that is addressable by the primary die 104 over the discovery bus 113 to discover presence and configuration information for the subsidiary dies 108(1)-108(N). A "page" discussed herein is simply one or more pieces or collections of data stored in a memory. The subsidiary die configuration page 200 is a data structure or collection of data stored in a particular memory location within each subsidiary die 108(1)-108(N) that is addressable by the CPU 102 and/or boot processor 110 over the discovery bus 113. This allows the CPU 102 and/or boot processor 110 to discover the presence of subsidiary dies 108(1)-108(N) through generalized address in boot-up firmware/software to address each of the subsidiary dies 108(1)-108(N). As shown in FIG. 2, in this example and as discussed in more detail below, the subsidiary die configuration page 200 includes a discovery page 202 and a link configuration page 204. The subsidiary dies 108(1)-108(N) can be programmed at manufacture for example to store the desired configuration information in the subsidiary die configuration page 200 such that this information can be discovered in run-time such as in a boot-up operation. The discovery page 202 contains information to identify the type of subsidiary die 108(1)-108(N) and other information relevant to address the remaining address space of the subsidiary die configuration page 200 for a subsidiary die 108(1)-108(N). As part of a boot-up process, the CPU 102 and/or the boot processor 110 will address the discovery page 202 of the subsidiary die configuration page 200 for each subsidiary die 108(1)-108(N) to discover how many and which type of subsidiary dies 108(1)-108(N) are present (i.e., connected) in the computing system 100.

With continuing reference to FIG. 2, the subsidiary die configuration page 200 also includes the link configuration page 204. The link configuration page 204 is addressable by the CPU 102 and/or the boot processor 110 over the discovery bus 113 for each discovered subsidiary die 108(1)-108(N) (discovered through its discovery page 202). In this example, the link configuration page 204 stores link configuration information that includes a link count indicator 206 that stores a link count for the number of communication ports 116, 118 configured as coupling such subsidiary die 108 to the primary die 104. In this example, the link count indicator 206 stores the number of actual physical links available for high speed communications. The link count stored in the link count indicator 206 is used by the CPU 102 and/or the boot processor 110 to then know how many communication links 114(1)-114(N) to discover as link configuration information about each communication port 116, 118 for a given communication link 114(1)-114(N). This information can then be used by the CPU 102 and/or the boot processor 110 to configure the communication links 114(1)-114(N) for the subsidiary die 108(1)-108(N) in the primary die 104.

For each link represented in the link count indicator 206 in the link configuration page 204 for a given subsidiary die 108(1)-108(N), the CPU 102 and/or the boot processor 110 can then address a communication link information array 208 and a link connectivity array 210 for each discovered subsidiary device 108(1)-108(N). The link information page 208 is an example of a link configuration page that is accessible for a subsidiary die 108(1)-108(N), through the discovery bus 113, to obtain link connectivity setup and initialization information for the communication links 114(1)-114(N). As discussed in more detail below with regard to FIG. 3B, the communication link information array 208 contains link array entries 212(1)-212(L) that each contain a sub-link count 214(1)-214(L). A separate link array entry 212(1)-212(L) is provided for each communication link 114(1)-114(N) connecting the subsidiary die 108(1)-108(N) to the primary die 104. Each sub-link count 214(1)-214(L) in a given separate link array entry 212(1)-212(L) indicates the number communication sub-links and/or their common characteristics (e.g., separate, multiple transmit and/or receive conductors or conductor pairs) for a given communication link 114(1)-114(N) connecting the subsidiary die 108(1)-108(N) to the primary die 104. For example, separate transmit and receive sub-links may be provided as part of a given communication link 114(1)-114(N).

Also as shown in FIG. 2, the link configuration page 204 also includes the link connectivity array 210 that includes link connection entries 216(1)-216(L) each storing a link configuration information for configuring the communication links 114(1)-114(N) and their communications sub-links for a given subsidiary die 108(1)-108(N). The link connectivity array 210 is also another example of a link configuration page that is accessible for a subsidiary die 108(1)-108(N), through the discovery bus 113, to obtain link connectivity setup and initialization information for the communication links 114(1)-114(N). Each link connection entry 216(1)-216(L) includes link configuration information on how to initialize and setup each of the communication sub-links of the communication links 114(1)-114(N) for a given subsidiary die 108(1)-108(N). For example, the link configuration information may include information on how each particular sub-link of a given communication links 114(1)-114(N) is to be configured.

FIG. 3A is a table illustrating an exemplary subsidiary die configuration page address map 300 for the exemplary subsidiary die configuration page 200 in FIG. 2. The subsidiary die configuration page address map 300 shows the addressing that can be used by the CPU 102 and/or the boot processor 110 to access information in the subsidiary die configuration page 200 of a particular addressed subsidiary die 108(1)-108(N) over the discovery bus 113 as part of a discovery process. As previously discussed, in this example, the address mapping shown in FIG. 3A for the subsidiary die configuration page 200 in FIG. 2 uses a static address mapping that will be the same for each subsidiary die 108(1)-108(N) so that the boot-up firmware/software can be generalized for discovering the subsidiary dies 108(1)-108(N). As also previously discussed, in this example, the subsidiary dies 108(1)-108(N) are accessed one at a time, via chip selects CS1-CSN, over the discovery bus 113, such that there will not be conflicts on the discovery bus 113 from the use of common address mapping to the subsidiary die configuration pages 200 for the individual subsidiary dies 108(1)-108(N).

In this regard, as shown in FIG. 3A, the subsidiary die configuration page address map 300 of subsidiary die configuration page 200 in FIG. 2, which includes the discovery page 202, the link configuration page 204, and a common logic page 302, as shown in the page region column 304. The discovery page 202 of a subsidiary die configuration page 200 in a subsidiary die 108(1)-108(N) is addressable between addresses 0x0000-0x3FFF in this example, as shown in address range columns 306, 308. The address range columns 306, 308 include examples of static and discoverable addresses for addressing a given subsidiary die 108(1)-108(N). The discovery page 202 in this example is a 16 kiloByte (kB) page region used for discovery of the die type of an addressed subsidiary die 108(1)-108(N) over the discovery bus 113 as well as relevant information used to parse the remaining address space in the subsidiary die configuration page 200. As also shown in FIG. 3A, the link configuration page 204 of a subsidiary die configuration page 200 in a subsidiary die 108(1)-108(N) is addressable starting at address 0x8000 in one example as in address range column 306 with a discoverable end addresses based on information contained in the discovery page 202. In another example, the link configuration page 204 of a subsidiary die configuration page 200 in a subsidiary die 108(1)-108(N) has a discoverable addresses based on information contained in the discovery page 202 so that there is additional flexibility in a subsidiary die 108(1)-108(N) controlling the address map of the link configuration page 204.

Examples of the information contained in the link configuration page 204 that can be discovered by the CPU 102 and/or the boot processor 110 in the primary die 104 for configuration and initializing the communication links 114 (1)-114(N) are discussed above with regard to FIG. 2.

As also shown in FIG. 3A, a common logic page 302 of a subsidiary die configuration page 200 in a subsidiary die 108(1)-108(N) is also included in the subsidiary die configuration page 200. The common logic page 302 contains information that is discoverable by the CPU 102 and/or the boot processor 110 to obtain control and/or register information for initiating boot-up operations in the accessed subsidiary die 108(10-108(N). The common logic page 302 may also contain information about clock controls, such as for a clock signal and a phase locked loop (PLL) circuit in the subsidiary die 108(1)-108(N), so that the CPU 102 and/or the boot processor 110 can initialize these circuits over the discovery bus 113 in the subsidiary die 108(1)-108 (N) as part of a boot-up process. These circuits may need to be initialized in order to support initiation and operation of the subsidiary discovery bus interface circuits 121(1)-121 (N) in the subsidiary dies 108(1)-108(N) for communications over its coupled communication links 114(1)-114(N). In this example, the common logic page 302 of a subsidiary die configuration page 200 in a subsidiary die 108(1)-108(N) is addressable between addresses 0x4000-0x7FFF in one example as in address range column 306. In another example, the common logic page 302 of a subsidiary die configuration page 200 in a subsidiary die 108(1)-108(N) has a discoverable addresses based on information contained in the discovery page 202 so that there is additional flexibility in a subsidiary die 108(1)-108(N) controlling the address map of the common logic page 302.

Figure 3B:
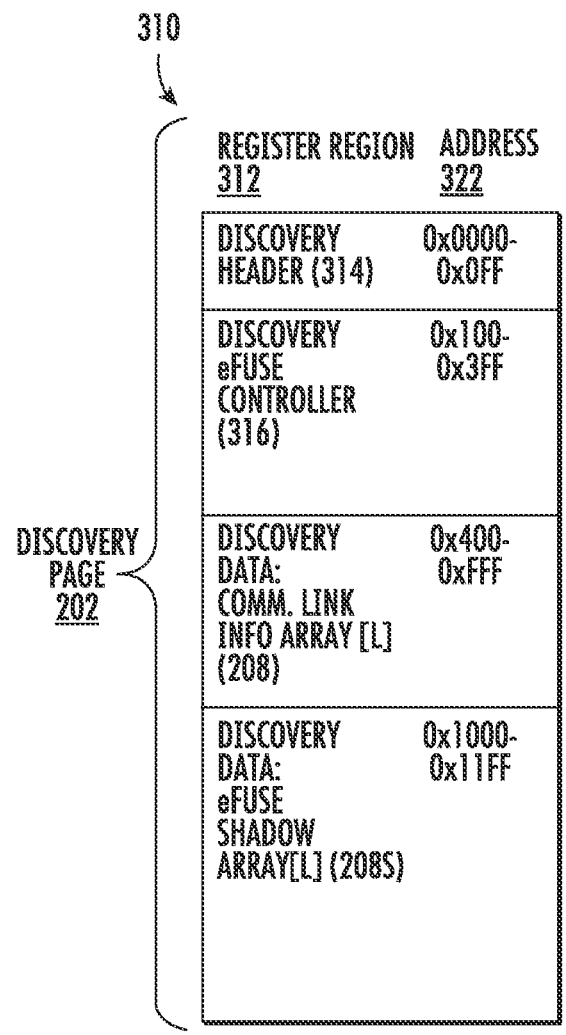
FIG. 3B is a table illustrating an exemplary discovery page address map for the device configuration page in FIG. 2 used by the primary die to discover the presence of the subsidiary dies included in the computing system.

FIG. 3B is a table illustrating an exemplary discovery page address map 310 for the exemplary discovery page 202 in FIGS. 2 and 3A. The discovery page address map 310 shows the addressing that can be used by the CPU 102 and/or the boot processor 110 to access information in the discovery page 202 of a particular addressed subsidiary die 108(1)-108(N) over the discovery bus 113 as part of a discovery process. As previously discussed, in this example, the information in the discovery page 202 of a subsidiary die 108(1)-108(N) is discovered by the CPU 102 and/or the boot processor 110 in the primary die 104 to discover the presence of a subsidiary die 108(1)-108(N) as part of a boot-up and initialization process for subsidiary dies 108(1)-108(N) present in the computing system 100 in FIG. 1. The address mapping shown in FIG. 3B for the discovery page 202 in the subsidiary die configuration page 200 in FIG. 2 uses static address mapping that will be the same for each subsidiary die 108(1)-108(N) so that the boot-up firmware/software can be generalized for discovering the information in the discovery pages 202 of the subsidiary dies 108(1)-108(N).

In this regard, as shown in FIG. 3B, as shown in the page region column 312, the discovery page address map 310 of the discovery page 202 in FIG. 2 includes discovery header page 314, a discovery eFUSE controller page 316, a communication link information array 208, and a discovery data eFUSE shadow array 208S. The discovery header page 314 in this example contains information regarding the die type of an addressed subsidiary die 108(1)-108(N) and information used to discover the remaining address space in the subsidiary die configuration page 200. In this example, the discovery page header 314 in the discovery page 202 for a subsidiary die 108(1)-108(N) is addressable at addresses 0x0000-0x00FF, as shown in the address range columns 322, 324. The discovery eFUSE controller page 316 in this example contains information as set by electronic fuse circuits in the subsidiary die 108(1)-108(N) for discovering information used to boot-up and/or initialize a subsidiary die 108(1)-108(N), such as link configuration information. In this example, the discovery eFUSE controller page 316 in the discovery page 202 for a subsidiary die 108(1)-108(N) is addressable at addresses 0x0100-0x03FF, as shown in the address range columns 322, 324.

With continuing reference to FIG. 3A, the communication link information array 208 in this example also contains information for discovering link configuration information used to boot-up and/or initialize the communication link 114(1)-114(N) for a given subsidiary die 108(1)-108(N). In this example, the communication link information array 208 contains information that is not stored in electronic fuses, but in modifiable memory circuits. The communication link information array 208 in the discovery page 202 for a subsidiary die 108(1)-108(N) is addressable at addresses 0x0400-0x0FFF, as shown in the address range columns 322, 324, but note that this address range could be discoverable instead of static addresses. The discovery data eFUSE shadow array 208S in this example may also contain information stored in a register format in electronic fuse shadow registers in a subsidiary die 108(1)-108(N) for ease of access. The discovery data eFUSE shadow array 208S contains information that describes the connectivity of each of the subsidiary die's 108(1)-108(N) communication links 114(1)-114(N), mapping it to a die identification for such subsidiary die 108(1)-108(N) and a communication link identification on the subsidiary die 108(1)-108(N). The discovery data eFUSE shadow array 208S is used to store information about subsidiary die's 108(1)-108(N) communication links 114(1)-114(N) in eFUSE registers in a subsidiary die 108(10-108(N) as an alternative to such information being in the communication link information array 208 of the discovery page 202. For example, the information stored in the discovery data eFUSE shadow array 208S, which shadows information stored in the eFUSE, can include information gated from automated test equipment (ATE) manufacturing testing, such as which cores in the CPU 102 and/or which communications links 114(1)-114(N) are operational. This information is used by the CPU 102 and/or the boot processor 110 for discovering link configuration information used to discover and setup the communication links 114(1)-114(N) for a discovered subsidiary die 108(1)-108(N).

Figure 4:
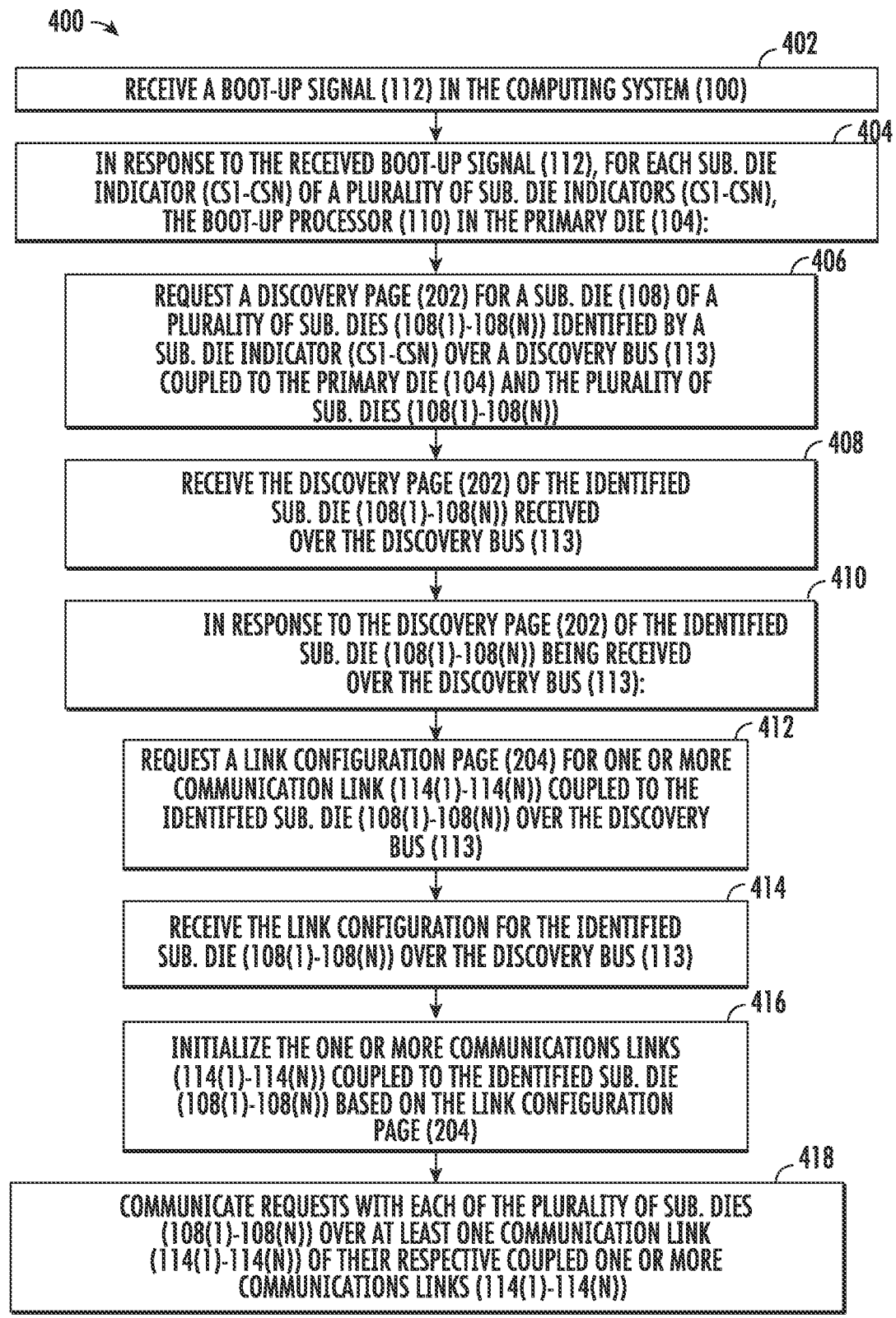
FIG. 4 is a flowchart illustrating an exemplary subsidiary die discovery process performed by the primary die as part of a boot-up operation of its computing system, to discover and initiate boot-up operations in the discovered subsidiary dies and initialize and activate dedicated communication links to the discovered subsidiary dies.

FIG. 4 is a flow chart illustrating an exemplary subsidiary die discovery process 400 performed by the CPU 102 and/or the boot processor 110 on the primary die 104 as part of a boot-up operation of its computing system 100. The CPU 102 and/or the boot processor 110 performs subsidiary die discovery process 400 to the discover, initialize, and initiate boot-up operations in the discovered subsidiary dies 108(1)-108(N), and initialize and activate dedicated the communication links 114(1)-114(N) to the discovered subsidiary dies 108(1)-108(N). The exemplary steps in the subsidiary die discovery process 400 in FIG. 4 are now discussed with reference to steps that can be performed by the boot processor 110 in the computing system 100 in FIG. 1, and the subsidiary die configuration page 200 and its exemplary components in FIGS. 2-3B as an example.

In this regard, as shown in FIG. 4, the boot processor 110 receives a boot-up signal 112 in the computing system 100 (block 402 in FIG. 4). In response to the received boot-up signal 112, for each subsidiary die indicator CS1-CSN of a plurality of subsidiary die indicators CS1-CSN (block 404 in FIG. 4), the boot processor 110 in the primary die 104 requests a discovery page 202 for a subsidiary die 108 of a plurality of subsidiary dies 108(1)-108(N) identified by a subsidiary die indicator CS1-CSN over a discovery bus 113 coupled to the primary die 104 and the plurality of subsidiary dies 108(1)-108(N) (block 406 in FIG. 4). Also, in response to the received boot-up signal 112, for each subsidiary die indicator CS1-CSN of a plurality of subsidiary die indicators CS1-CSN (block 404 in FIG. 4), the boot processor 110 discovers (i.e., addresses and receives) the discovery page 202 of the identified subsidiary die 108(1)-108(N) received over the discovery bus 113 (block 408 in FIG. 4).

In response to the discovery page 202 of the identified subsidiary die 108(1)-108(N) being received over the discovery bus 113 (block 410 in FIG. 4), the boot processor 110 requests a link configuration page 204 for one or more communication links 114(1)-114(N) coupled to the identified subsidiary die 108(1)-108(N) over the discovery bus 113 (block 412 in FIG. 4). Also in response to the discovery page 202 of the identified subsidiary die 108(1)-108(N) being received over the discovery bus 113 (block 410 in FIG. 4), the boot processor 110 receives the link configuration for the identified subsidiary die 108(1)-108(N) over the discovery bus 113 (block 414 in FIG. 4). Also in response to the discovery page 202 of the identified subsidiary die 108(1)-108(N) being received over the discovery bus 113 (block 410 in FIG. 4), the boot processor 110 initializes the one or more communication links 114(1)-114(N) coupled to the identified subsidiary die 108(1)-108(N) based on the link configuration page 204 (block 416 in FIG. 4). The CPU 102 in the primary die 104 can then begin communicating requests with each of the plurality of subsidiary dies 108(1)-108(N) over at least one communication link 114(1)-114(N) of their respective coupled one or more communication links 114(1)-114(N) (block 418 in FIG. 4).

If in block 410, a discovery page 202 for the identified subsidiary die 108(1)-108(N) is not received over the discovery bus 113, the boot processor 110 will not request a link configuration page 204 over the discovery bus 113 for such identified subsidiary die 108(1)-108(N). This is because not receiving a discovery page 202 for a subsidiary die 108(1)-108(N) in this example means that such subsidiary die 108(1)-108(N) is not present in the computing system 100. In this example, the primary die 104 is not aware in advance of how many subsidiary dies 108(1)-108(N) are present in the multi-die computing system 100, which as discussed above, provides flexibility in allowing the boot-up firmware/software executed by the primary die 104 to be generalized for discovering the subsidiary dies 108(1)-108(N). If, in response to an initiated communication by the primary die 104 to a specific addressed subsidiary die 108(1)-108(N) (e.g., through use of a chip select CS1-CSN), the primary die 104 does not receive a response over the discovery bus 113 for a particular subsidiary die 108(1)-108(N), the primary die 104 assumes that such subsidiary die 108(1)-108(N) is not present in the computing system 100.

FIG. 5 is a flow chart illustrating another exemplary subsidiary die discovery process 500 performed by the CPU 102 and/or the boot processor 110 on the primary die 104 as part of a boot-up operation of its computing system 100 represented in pseudocode. The CPU 102 and/or the boot processor 110 performs subsidiary die discovery process 500 to the discover, initialize, and initiate boot-up operations in the discovered subsidiary dies 108(1)-108(N), and initializes and activates dedicated communication links 114(1)-114(N) to the discovered subsidiary dies 108(1)-108(N). The exemplary steps in the subsidiary die discovery process 500 in FIG. 5 are now discussed with reference to steps that can be performed by the boot processor 110 in the computing system 100 in FIG. 1, and the subsidiary die configuration page 200 and its exemplary components in FIGS. 2-3B as an example.

In this regard, with reference to FIG. 5, a first boot-up task that can be performed by the boot processor 110 is to perform an initialization loop 502 for each subsidiary die 108(1)-108(N) that could be present in the computing system 100. As discussed above, the boot processor 110 can use the programmed possibility of chip selects CS1-CSN as subsidiary die indicators to perform boot-up tasks for each subsidiary die 108(1)-108(N). Then, for the next subsidiary die 108(1)-108(N) that is selected, the boot processor 110 selects the chip select CS1-CSN for such next subsidiary die 108(1)-108(N) and sends a request to receive the discovery page 202 of such subsidiary die 108(1)-108(N) over the discovery bus 113 (block 504 in FIG. 5). The boot processor 110 then parses the received discovery page 202 for the current addressed subsidiary die 108(1)-108(N) to determine the die type of the subsidiary die 108(1)-108(N) and other discovery configuration information as discussed above (block 506 in FIG. 5). In this example, the boot processor 110 then determines if an electronic fuse (eFUSE) configuration is supported by the current addressed subsidiary die 108(1)-108(N) (block 508 in FIG. 5). If so, the configuration data for the current addressed subsidiary die 108(1)-108(N) is loaded from the eFUSEs (e.g., the discovery data eFUSE shadow array 208S) into registers in the primary die 104 for use for boot-up tasks and/or other configuration of the current addressed subsidiary die 108(1)-108(N) (block 510 in FIG. 5). If the electronic fuses (eFUSEs) information received over the discovery bus 113 for the current addressed subsidiary die 108(1)-108(N) is valid (block 512 in FIG. 5), the boot processor 110 processes the eFUSE data stored in the registers in the primary die 104 and discovers the eFUSE shadow array 208S in the discovery page 202 of the addressed subsidiary die 108(1)-108(N), as shown in FIG. 3B, to process the link connectivity array 210 shown in FIG. 2 to configure to communication links 114(1)-114(N) (block 514 in FIG. 5). If however, eFUSE is not supported by the current addressed subsidiary die 108(1)-108(N)(block 516 in Figure the boot processor 110 addresses and processes link configuration information in the communication link information array 208 from the discovery page 202 as shown in FIG. 3B, to process the link connectivity array 210 shown in FIG. 2 to configure to communication links 114(1)-114(N) (block 518 in FIG. 5).

With continuing reference to FIG. 5, the boot processor 110 then discovers the common logic page 302 in the subsidiary die configuration page 200 as shown in FIG. 3A to instruct the current subsidiary die 108(1)-108(N) to initialize its common logic circuits (e.g., clock circuits, PLL circuits) (block 519 in FIG. 5). The boot processor 110 is configured to send a logic initialization command over the discovery bus 113 for the identified subsidiary die 108(1)-108(N) based on its accessed common logic page 302. In response, the identified subsidiary die 108(1)-108(N) receives the logic initialization command over the discovery bus 113 and initializes one or more of its logic circuits in its subsidiary die 108(1)-108(N) based on received logic initialization command.

With continuing reference to FIG. 5, the boot processor 110 then discovers the link configuration page 204 of the subsidiary die configuration page 200 for current subsidiary die 108(1)-108(N) to setup and initialize its communication links 114(1)-114(N) for current subsidiary die 108(1)-108(N) and their communication sub-links. The boot processor 110 determines the number of communication sub-links for the communication links 114(1)-114(N) configured for the current subsidiary die 108(1)-108(N) based on information in the link configuration page 204 (block 520 in FIG. 5). The boot processor 110 then parses the communication link information array 208 as shown in FIG. 3B to gather link configuration information for the communication links 114(1)-114(N) of the current subsidiary die 108(1)-108(N) (block 522 in FIG. 5). Then, the boot processor 110 performs a communications configuration initialization loop 524 for each RDI communication link 114(1)-114(N) configured for the subsidiary die 108(1)-108(N). The boot processor 110 determines the number of communication sub-links for the current RDI communication links 114(1)-114(N) to be configured (block 526 in FIG. 5). Then, for each communication sub-link for the current RDI communication link 114(1)-114(N), the boot processor 110 locates the communication link 114(1)-114(N) on the subsidiary die 108(1)-108(N) (block 528 in FIG. 5), initializes both sides (e.g., a transmit and receive side) of the communication sub-link (block 530 in FIG. 5), and updates the status of the communication link 114(1)-114(N) for a global connectivity structure 602 (e.g., mesh network) (shown in FIG. 6 and described below) (block 532 in FIG. 5). If the initialization of both sides (e.g., a transmit and receive side) of the communication sub-link in block 530 in FIG. 5) is successful, the boot processor 110 indicates that both sides (e.g., a transmit and receive side) of the communication sub-link for the communication link 114(1)-114(N) of the subsidiary die 108(1)-108(N) has been initialized (block 534 in FIG. 5). If not successful, the boot processor 110 indicates that the communication sub-link for the communication link 114(1)-114(N) of the subsidiary die 108(1)-108(N) failed to initialize and generates a communication link error (block 536 in FIG. 5).

Figure 6:
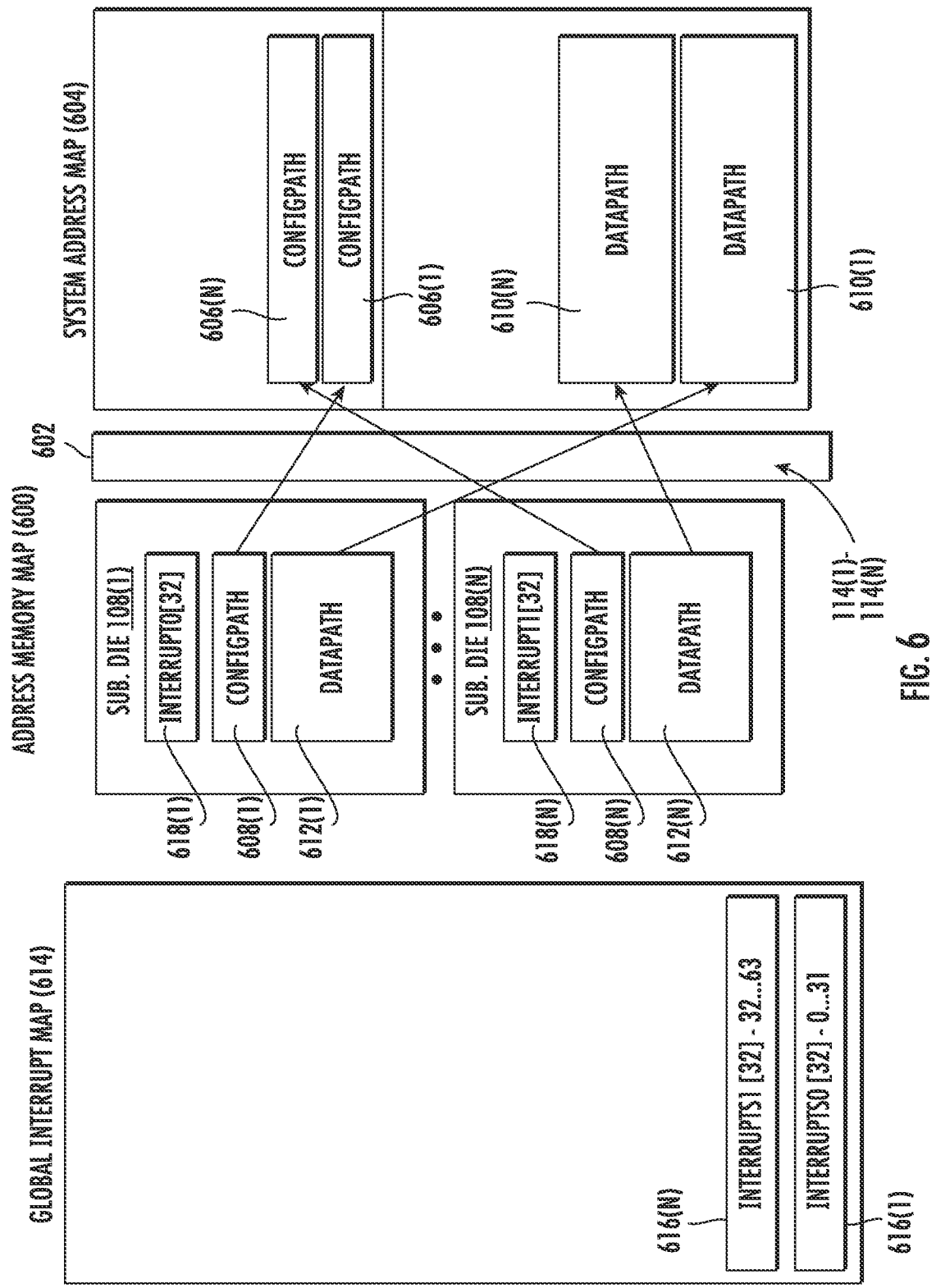
FIG. 6 is a block diagram illustrating an exemplary address memory map created by the primary die as part of the discovery process to configure the mapping of interrupts, and configuration and data paths for the dedicated communication links between the primary die and the subsidiary dies discovered in the computing system.

FIG. 6 is a block diagram illustrating an exemplary address memory map 600 created by the primary die 104 as part of the discovery process to configure the mapping of interrupts, and configuration and data paths for the communication links 114(1)-114(N) between the primary die 104 and the subsidiary dies 108(1)-108(N) discovered in the computing system 100. In this manner, the CPU 102 can use the address memory map 600 to address the individual subsidiary dies 108(1)-108(N) over the communication links 114(1)-114(N) when their resources are required and/or to identify interrupts and from which subsidiary die 108(1)-108(N) such interrupt was initiated for interrupt service handling. The address memory map 600 can be created by the CPU 102 and/or the boot processor 110 as part of the discovery process according to received information in a discovery page 202 of the subsidiary dies 108(1)-108(N) as an example.

In this regard, with reference to FIG. 6, as discussed above, the boot processor 110 receives address space information for subsidiary dies 108(1)-108(N) from their discovery pages 202 over the discovery bus 113 in an example. The boot processor 110 builds an address memory map 600 based on this discovered information for the subsidiary dies 108(1)-108(N) to be able to address the subsidiary dies 108(1)-108(N) over their communication links 114(1)-114(N). Building the address memory map 600 may include building a system address map 604 in the primary die 104 that contains the configuration path address ranges 606(1)-606(N) received from discovery information 608(1)-608(N) in the subsidiary dies 108(1)-108(N) over the communication links 114(1)-114(N). The boot processor 110 also builds in the system address map 604 in the primary die 104, data path address ranges 610(1)-610(N) received from discovery page 202 in the subsidiary dies 108(1)-108(N) to then be able to address data 612(1)-612(N) in the subsidiary dies 108(1)-108(N) over the communication links 114(1)-114(N). The system address map 604 in essence builds an address map for accessing the subsidiary dies 108(1)-108(N) over the communication links 114(1)-114(N) in a global connectivity structure 602. In this example, the global connectivity structure 602 identifies where various PCIe and DDR functions are located. Along with system address map 604, the global connectivity structure 602 can identify resources available in the computing system 100 and how they can be accessed (e.g., at what system address). The global connectivity structure 602 could also store information for sockets. With continuing reference to FIG. 6, the boot processor 110 also receives interrupt mapping information for the subsidiary dies 108(1)-108(N) from their discovery pages 202 over the discovery bus 113 in an example. The boot processor 110 builds a global interrupt map 614 based on this discovered information for the subsidiary dies 108(1)-108(N) to be able to map out and identify interrupts received from the subsidiary dies 108(1)-108(N), such as over their communication links 114(1)-114(N). The boot processor 110 builds the global interrupt map 614 in the primary die 104 that contains the interrupt identifiers 616(1)-616(N) based on information from the discovery pages 202 of the discovered subsidiary dies 108(1)-108(N) to then be able to identify received interrupts 618(1)-618(N) in the subsidiary dies 108(1)-108(N). In this manner, when the CPU 102 receives an interrupt indicator from a subsidiary die 108(1)-108(N), the CPU 102 can access the global interrupt map 614 to identify from which subsidiary die 108(1)-108(N) the interrupt originated as well as the type of interrupt to correlate the interrupt indicator to an interrupt identifier in the global interrupt map 614 then perform a designated interrupt service routine.

FIG. 7 is a table illustrating exemplary alternative subsidiary die configuration page 200A that may be configured for the subsidiary dies 108(1)-108(N) to allow the primary die 104 to also access local system memory 700 and a local configuration debug page 702 in a subsidiary die 108(1)-108(N). In this manner, as an example, the discovery bus 113 can be used as a type of "backdoor" bus to access the subsidiary die 108(1)-108(N) for debug information, such as if a communication link 114(1)-114(N) of is not operational for a subsidiary die 108(1)-108(N). Common pages between the subsidiary die configuration page 200A in FIG. 7 and the subsidiary die configuration page 200 in FIG. 3A are shown with common element numbers. As shown in FIG. 7, in this example, the subsidiary die configuration page 200A includes a local system memory access page 700 and a local configuration debug page 702. The local system memory access page 700 is an optional system memory page that can be discovered by the CPU 102 and/or the boot processor 110 to access local memory in the subsidiary die 108(1)-108(N) over the discovery bus 113. The local system memory access page 700 of the subsidiary die configuration page 200A in a subsidiary die 108(1)-108(N) is addressable starting at address 0x8001 in one example as shown in the address range column 306 with the address range being die dependent and discoverable. In another example, the local system memory access page 700 of the subsidiary die configuration page 200A in a subsidiary die 108(1)-108(N) is addressable in an address range discoverable through the discovery page 202.

With continuing reference to FIG. 7, the local configuration debug page 702 is another optional system memory page that can be discovered by the CPU 102 and/or the boot processor 110 to access local memory in the subsidiary die 108(1)-108(N) over the discovery bus 113. The local configuration debug page 702 of the subsidiary die configuration page 200A in a subsidiary die 108(1)-108(N) contains debug information for the subsidiary die 108(1)-108(N) that is accessible through addressing of the local configuration debug page 702 over the discovery bus 113. In this manner, the discovery bus 113 can be used as a type of "backdoor" bus to access the subsidiary die 108(1)-108(N) for debug information, such as if a communication link 114(1)-114(N) of is not operational for a subsidiary die 108(1)-108(N). In one example, the local configuration debug page 702 is addressable starting at address as shown in the address range column 306 with the address range being die dependent and discoverable. In another example, the local configuration debug page 702 of the subsidiary die configuration page 200A in a subsidiary die 108(1)-108(N) is addressable in an address range discoverable through the discovery page 202.

FIG. 8 is a block diagram illustrating an example of a processor-based system 800 that can include a computing system 802 like in FIG. 1, as a non-limiting example. The computing system 802 includes a system-on-a-chip (SoC) 804 that includes a primary die 806 that includes a CPU 808 and/or a boot processor 810. The SoC 804 also includes a plurality of subsidiary dies 812(1)-812(N) communicatively coupled to the primary die 806 through a discovery bus 814. In a boot-up operation, the CPU 808 and/or its boot processor 810 in the primary die 806 can discover the other subsidiary dies 812(1)-812(N) through communications on the discovery bus 814. The subsidiary dies 812(1)-812(N) and the primary die 806 exchange information (e.g., configuration information, communication information) on the discovery bus 814 sufficient for the CPU 808 and/or the boot processor 810 to detect the presence of subsidiary dies 812(1)-812(N) and communication links and/or other configuration information for each of the subsidiary dies 812(1)-812(N) to then initialize communication links 816(1)-816(N) coupled to the subsidiary dies 812(1)-812(N). The CPU 808 can then communicate to each of the subsidiary dies 812(1)-812(N) when their resources are needed over their respective communication links 816(1)-816(N). The functionality discussed above with regard to the computing system 100 in FIG. 1 can also be applicable to the computing system 802 in the processor-based system 800 in FIG. 8.

With continuing reference to FIG. 8, the CPU 808 is coupled to a system bus 818 and can intercouple initiator and target devices included in the processor-based system 800. As is well known, the CPU(s) 808 communicates with these other devices by exchanging address, control, and data information over the system bus 818. For example, the CPU 808 can communicate bus transaction requests to a memory controller 820 as an example of a subsidiary device as part of a memory system 822. Although not illustrated in FIG. 8, multiple system buses 818 could be provided, wherein each system bus 818 constitutes a different fabric.

Other initiator and target devices can be connected to the system bus 818. As illustrated in FIG. 8, these devices can include the memory system 822, one or more input devices 824, one or more output devices 826, one or more network interface devices 828, and one or more display controllers 830, as examples. The input device(s) 824 can include any type of input device, including, but not limited to, input keys, switches, voice processors, etc. The output device(s) 826 can include any type of output device, including, but not limited to, audio, video, other visual indicators, etc. The network interface device(s) 828 can be any device(s) configured to allow exchange of data to and from a network 832. The network 832 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 828 can be configured to support any type of communications protocol desired. The memory system 822 can include the memory controller 820 coupled to one or more memory arrays 834 to store data.

The CPU 808 may also be configured to access the display controller(s) 830 over the system bus 818 to control information sent to one or more displays 836. The display controller(s) 830 sends information to display(s) 836 to be displayed via one or more video processors 838, which process the information to be displayed into a format suitable for the display(s) 830. The display(s) 836 can include any type of display, including, but not limited to, a cathode ray tube (CRT), a liquid crystal display (LCD), a plasma display, a light emitting diode (LED) display, etc.

The primary die 806 in the SoC 804 of the computing system 802 may include a set of computer-readable instructions 840 stored in a non-transitory computer-readable medium 842 (e.g., a memory) that can be executed by the boot processor 810 to perform boot-up tasks. Also, other components of the processor-based system 800 in FIG. 8 can include computer-readable instructions 844 stored in a non-transitory computer-readable medium 846 (e.g., a memory) that can be accessed by the CPU 808 and/or the boot processor 810 to be executed to perform tasks, such as in the case of the boot processor 810, higher level boot-up tasks. These computer-readable instructions 844 can be stored in the memory array 834 as a computer-readable medium 846. The computer-readable instructions 844 may also reside, completely or at least partially, within the memory system 822 during their execution. The computer-readable instructions 844 may further be transmitted or received over the network 832 via the network interface device 828, such that the network 832 includes the non-transitory computer-readable medium 538. The computer-readable instructions 844 may further be transmitted or received from the input device 824.

While the non-transitory computer-readable mediums 842, 846 are shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The initiator devices and target devices described herein may be employed in any circuit, hardware component, integrated circuit (IC), or IC chip, as examples. A processor is a circuit that can include a microcontroller, a microprocessor, or other circuit that can execute software or firmware instructions. A controller is a circuit that can include microcontroller, a microprocessor, and/or dedicated hardware circuits (e.g., a field programmable gate array (FPGA)) that do not necessarily execute software or firmware instruction. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of non-transitory computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

What is claimed is:

1. A computing system, comprising:
a primary die comprising a central processing unit (CPU);
a plurality of subsidiary dies each coupled to one or more communication links coupled to the primary die; and
a discovery bus coupled to the primary die and the plurality of subsidiary dies;
the primary die further comprising a boot processor configured to, in response to a boot-up response for the computing system, for each subsidiary die indicator of a plurality of subsidiary die indicators:
request a discovery page for the subsidiary die of the plurality of subsidiary dies identified by the subsidiary die indicator over the discovery bus;
receive the discovery page of the identified subsidiary die over the discovery bus; and
in response to the discovery page of the identified subsidiary die being received over the discovery bus:
request a link configuration page for the one or more communication links coupled to the identified subsidiary die over the discovery bus;
receive the link configuration page for the identified subsidiary die over the discovery bus; and
initialize the one or more communication links coupled to the identified subsidiary die based on the received link configuration page; and
the CPU configured to subsequently communicate requests with each of the plurality of subsidiary dies over at least one communication link of their respective coupled one or more communication links.

2. The computing system of claim 1, wherein the boot processor is further configured to, for each subsidiary die indicator of a plurality of subsidiary die indicators, in response to not determining the discovery page of the identified subsidiary die is not received over the discovery bus:
not request a link configuration page for the one or more communication links coupled to the identified subsidiary die over the discovery bus.

3. The computing system of claim 1, wherein:
each of one or more communication links comprises one or more communication sub-links;
the link configuration page comprises one or more communication sub-link indicators; and
the boot processor is configured to initialize for each of the one or more communication sub-link indicators of each of the one or more communication links, the one or more communication sub-links identified by the one or more communication sub-link indicators.

4. The computing system of claim 1, wherein:
each of the one or more communication links comprise one or more transmit communication links and one or more receive communication links; and
the boot processor is configured to initialize the one or more communication links coupled to the identified subsidiary die, by being configured to initialize the one or more transmit communication links and the one or more receive communication links of the one or more communication links coupled to the identified subsidiary die, based on the received link configuration page.

5. The computing system of claim 1, wherein the boot processor is further configured to, in response to the discovery page of the identified subsidiary die being received over the discovery bus:
determine if the one or more communication links coupled to the identified subsidiary die was initialized based on the received link configuration page; and
in response to determining the one or more communication link coupled to the identified subsidiary die was not initialized, generate a communication link error for the one or more communication links.

6. The computing system of claim 1, wherein:
the boot processor is further configured to, in response to the discovery page of the identified subsidiary die being received over the discovery bus:
request a logic configuration for identified subsidiary die over the discovery bus;
receive the logic configuration for the identified subsidiary die over the discovery bus; and
in response to receiving the logic configuration for the identified subsidiary die over the discovery bus:
send a logic initialization command over the discovery bus for the identified subsidiary die; and
the identified subsidiary die configured to:
receive the logic initialization command over the discovery bus; and
initialize at least one logic circuit in its subsidiary die based on received logic initialization command.

7. The computing system of claim 6, wherein the at least one logic circuit is comprised from the group consisting of a clock circuit and a phase locked loop (PLL) circuit.

8. The computing system of claim 1, wherein the boot processor is further configured to, in response to the discovery page of the identified subsidiary die being received over the discovery bus, initiate one more boot-up operations to the identified subsidiary die over the communication link coupled to the identified subsidiary die.

9. The computing system of claim 1, wherein:
the boot processor is further configured to, in response to the discovery page of the identified subsidiary die being received over the discovery bus:
receive an address space of the identified subsidiary die in the discovery page; and
build the received address space of the identified subsidiary die into a system address map in the primary die for accessing the identified subsidiary die; and
the boot processor is further configured to access the address space in the identified subsidiary die over the one or more communication links coupled to identified subsidiary die using an address in the address space of the identified subsidiary die in the system address map.

10. The computing system of claim 9, wherein the address space of the identified subsidiary die comprises a configuration address space and a data address space.

11. The computing system of claim 1, wherein:
the boot processor is further configured to, in response to the discovery page of the identified subsidiary die being received over the discovery bus:
receive a plurality of interrupt identifiers for the identified subsidiary die in the discovery page; and build the received plurality of interrupt identifiers for the identified subsidiary die into a global interrupt map in the primary die; and the boot processor is further configured to:
receive an interrupt comprising an interrupt indicator;
determine from which subsidiary die among the plurality of subsidiary dies the interrupt was generated based on correlating the interrupt indicator to an interrupt identifier in global interrupt map; and
execute an interrupt service routine based on the determined interrupt identifier.

12. The computing system of claim 1, wherein the primary die further comprises a discovery bus interface circuit communicatively coupled to the bus interface circuit and the discovery bus;
wherein the boot processor is configured to access the discovery bus through the discovery bus interface circuit.

13. The computing system of claim 1 integrated into an integrated circuit (IC) package.

14. The computing system of claim 1, wherein the one or more communication links comprise one or more dedicated communication links each coupled each subsidiary die of the plurality of subsidiary dies.

15. A method of performing a boot-up operation for discovered subsidiary dies in a computing system, comprising;
receiving a boot-up signal in the computing system;
in response to the received boot-up signal, for each subsidiary die indicator of a plurality of subsidiary die indicators, a boot-up processor in a primary die:
requesting a discovery page for a subsidiary die of a plurality of subsidiary dies identified by a subsidiary die indicator over a discovery bus coupled to the primary die and the plurality of subsidiary dies;
determining the discovery page of the identified subsidiary die being received over the discovery bus;
in response to the discovery page of the identified subsidiary die being received over the discovery bus:
requesting a link configuration page for one or more communication link coupled to the identified subsidiary die over the discovery bus;
receiving the link configuration page for the identified subsidiary die over the discovery bus; and
initializing the one or more communication links coupled to the identified subsidiary die based on the received link configuration page; and
communicating requests with each of the plurality of subsidiary dies over at least one communication link of their respective coupled one or more communication links.

16. The method of claim 15, further comprising, the boot processor, for each subsidiary die indicator of a plurality of subsidiary die indicators, in response to not determining the discovery page of the identified subsidiary die is not received over the discovery bus:
not requesting a link configuration page for the one or more communication link coupled to the identified subsidiary die over the discovery bus.

17. The method of claim 15, wherein the boot processor is configured to initialize for each of the one or more communication links coupled to the identified subsidiary die, one or more communication sub-links identified by the one or more communication sub-link indicators.

18. The method of claim 15, further comprising the boot processor, in response to the discovery page of the identified subsidiary die being received over the discovery bus:

determining if the one or more communication links coupled to the identified subsidiary die was initialized based on the received link configuration page; and
in response to determining the one or more communication link coupled to the identified subsidiary die was not initialized, generating a communication link error for the one or more communication link.

19. The method of claim 15, further comprising:
the boot processor, in response to the discovery page of the identified subsidiary die being received over the discovery bus:
requesting a logic configuration for identified subsidiary die over the discovery bus; and
receiving the logic configuration for the identified subsidiary die over the discovery bus; and
in response to receiving the logic configuration for the identified subsidiary die over the discovery bus:
sending a logic initialization command over the discovery bus for the identified subsidiary die; and
the identified subsidiary die:
receiving the logic initialization command over the discovery bus; and
initializing at least one logic circuit in its subsidiary die based on received logic initialization command.

20. The method of claim 15, further comprising the boot processor, in response to the discovery page of the identified subsidiary die being received over the discovery bus, initiating one or more boot-up operations to the identified subsidiary die over the one or more communication link coupled to the identified subsidiary die.

21. The method of claim 15, further comprising the boot processor:
in response to the discovery page of the identified subsidiary die being received over the discovery bus:
receiving an address space of the identified subsidiary die in the discovery page; and
building the received address space of the identified subsidiary die into a system address map in the primary die for accessing the identified subsidiary die; and
accessing the address space in the identified subsidiary die over the one or more communication links using an address in the address space of the identified subsidiary die in the system address map.

22. The method of claim 15, further comprising the boot processor:
in response to the discovery page of the identified subsidiary die being received over the discovery bus:
receiving a plurality of interrupt identifiers for the identified subsidiary die in the discovery page; and
building the received plurality of interrupt identifiers for the identified subsidiary die into a global interrupt map in the primary die;
receiving an interrupt comprising an interrupt indicator;
determining from which subsidiary die among the plurality of subsidiary dies the interrupt was generated based on correlating the interrupt indicator to an interrupt identifier in global interrupt map; and
executing an interrupt service routine based on the determined interrupt identifier.

23. A non-transitory computer-readable medium having stored thereon computer executable instructions which, when executed by a processor in a primary die in a computing system, cause the processor to perform a boot-up operation for discovered subsidiary dies in the computing system, by causing the processor to:
receive a boot-up signal;

in response to the received boot-up signal, for each subsidiary die indicator of a plurality of subsidiary die indicators:
  request a discovery page for a subsidiary die of a plurality of subsidiary dies coupled to one or more communication links identified by a subsidiary die indicator over a discovery bus communicatively coupled to the primary die and the plurality of subsidiary dies;
  receive the discovery page of the identified subsidiary die received over the discovery bus; and
  in response to the discovery page of the identified subsidiary die being received over the discovery bus:
    request a link configuration page for the one or more communication links coupled to the identified subsidiary die over the discovery bus;
    receive the link configuration page for the identified subsidiary die over the discovery bus; and
    initialize the one or more communication links coupled to the identified subsidiary die based on the received link configuration page; and
communicate requests with each of the plurality of subsidiary dies over at least one communication link of their respective coupled one or more communication links.

* * * * *